United States Patent

Logan

[11] Patent Number: 6,029,695
[45] Date of Patent: Feb. 29, 2000

[54] ROTARY UNION FOR TRANSMITTING A HIGH PRESSURE MEDIUM

[76] Inventor: Michael Logan, 12003-49th St. N., Clearwater, Fla. 33762

[21] Appl. No.: 09/121,960

[22] Filed: Jul. 24, 1998

[51] Int. Cl.[7] .................................................. F16L 55/07
[52] U.S. Cl. ............................................. 137/580; 285/14
[58] Field of Search ............................. 137/580; 285/13, 285/14, 272, 278, 280; 277/570, 946; 134/167 C, 168 C, 179, 176

[56] References Cited

U.S. PATENT DOCUMENTS

| | | | |
|---|---|---|---|
| 3,089,713 | 5/1963 | Scaramucci | 285/14 |
| 3,517,694 | 6/1970 | Lieffring | 137/580 X |
| 3,923,133 | 12/1975 | Chivari | 137/580 X |
| 4,020,910 | 5/1977 | Peterson et al. | 277/165 X |
| 4,074,908 | 2/1978 | Spencer | 277/946 |
| 4,266,620 | 5/1981 | Wolgamott et al. | 137/580 X |
| 4,302,033 | 11/1981 | Evans et al. | 285/14 |
| 4,406,469 | 9/1983 | Allison | 277/946 |
| 4,449,739 | 5/1984 | Raether | 285/14 |
| 4,817,995 | 4/1989 | Deubler et al. | 285/14 X |
| 4,827,834 | 5/1989 | Leigh-Monstevens | 277/166 X |
| 4,832,511 | 5/1989 | Nisley et al. | 277/95 X |
| 4,875,786 | 10/1989 | DeWachter | 277/9.5 X |
| 5,052,464 | 10/1991 | Natori | 164/80 |
| 5,058,927 | 10/1991 | Miwa | 285/14 X |
| 5,106,105 | 4/1992 | Drexler | 277/3 |
| 5,240,039 | 8/1993 | Colussi et al. | 137/580 |
| 5,494,299 | 2/1996 | Rockwood | 277/15 |
| 5,538,292 | 7/1996 | Sommer | 137/580 |
| 5,560,420 | 10/1996 | Hansen et al. | 164/114 |
| 5,622,196 | 4/1997 | Luongo | 134/179 X |
| 5,626,345 | 5/1997 | Wallace | 277/1 |
| 5,653,476 | 8/1997 | Su et al. | 285/14 X |

*Primary Examiner*—John Rivell
*Assistant Examiner*—Meredith H. Schoenfeld
*Attorney, Agent, or Firm*—Pendorf & Cutliff

[57] ABSTRACT

A high pressure rotary union characterized by easy field maintenance and optimal simplified design. This design ensures high-speed operation without any significant loss of water pressure at pressures of about 4000 p.s.i. Vents are provided through which fluid bypassing the main seal exits the housing, providing an indication of loss of main seal. A secondary seal is provided to protect the bearing(s) from fluid.

18 Claims, 3 Drawing Sheets

ROTARY UNION FOR TRANSMITTING A HIGH PRESSURE MEDIUM

BACKGROUND OF THE INVENTION

1. Field of Invention

The present invention relates to an improved wide throat high-pressure high-rpm rotary union which is greatly simplified in design, yet provides a number of advantages over state-of-the-art rotary unions, such as the ability to channel water under high pressure without pressure drop, the ability to provide external indication of seal failure, the ability to protect bearings from water damage, simplified maintenance, and longer operating life under high-pressure high-rpm conditions. These design features particularly provide for ease of on-site seal replacement and low down time.

2. Discussion of the Related Art

In industrial and residential environments fluid pressure is used for cleaning and washing applications. To effect good cleaning or scouring, it is desirable to impart motion to the spray fluid as by rotation of the spray fluid head. This motion distributes the fluid so as to impact all exposed areas of the work surface, and assists in dislodging and flushing dirt or other unwanted matter.

Rotary unions, often referred to as swivel joints, are used in applications when necessary to couple the stationary outlet of fluid sources (i.e., water main, hoses, etc.) to rotating sprayer devices (e.g., rotating spray nozzles or sprayer arms). These rotary unions are used, for example, in devices for delivering sprays of fluid such as water, often with detergents or additives, onto work surface to be treated, as in driveway or sidewalk cleaning operations or automobile washing operations.

Examples of rotating spray nozzle assemblies presently in use include those disclosed in U.S. Pat. No. 3,950,045. This patent teaches a rotatable bearing assembly comprising a relatively fixed part and a rotatable part designed for high-speed operation at pressures of up to 3,000 psi, and including a governor for limiting the rotational speed of the rotatable part. This patent addresses the problem of extremely high frictional forces that develop between the bearing surfaces, which in turn cause high wear causing a breakdown of the bearing. To avoid this problem and reduce friction, this patent teaches that the bearing surfaces are to be lubricated by permitting a leak-by of, e.g. <10%, of washing fluid (col. 3, line 17). However, this leakage undesirably reduces the pressure flowing to the spray head, reducing washing power.

U.S. Pat. No. 5,104,044 teaches a hydroactuatable spinner comprising a turbine assembly to impart rotation to a spray rotor of pressures of 500–1000 p.s.i. The turbine uses impelling fluid pressure causing some loss of flow. Conventional O-rings are used in a basic design to prevent the leakage within the unit, but these O-rings are liable to rapid wear and there is no built-in indicator to show when the O-rings are worn. Further, the pressure to which this design can be subjected is limited.

U.S. Pat. No. 5,269,345 teaches a device for transferring a pressure medium from a stationary first component into a second component, which is rotatably driven within the first component. Between the two components an annular chamber is provided, to which are connected an inlet line and an outlet line for guiding the medium to the consuming device. Radially extending sealing slots are defined between a first stationary component and a second component that is inserted into the first stationary component such that it is rotatably driveable therein. These two sealing slots are simultaneously movable and have adjustable slot widths. There is no easy of determining if the sealing surfaces are worn and need replacing. Furthermore, the assembly is not simple and is not designed to be repaired in the field.

U.S. Pat. No. 5,456,412 teaches a rotary spray nozzle on wheels. The rotary spray arm is caused to rotate and to achieve rotational cleaning in a rotational direction opposite from the water jet impingement angle. A pressure ring, preferably in the form of a V-ring with coil spring inserts, is positioned between the housing and rotary axle. A thrust bearing is also provided to retain the rotary axle in place. This seal and bearing arrangement cannot be subjected to very high pressures, is liable to wear, and there is no easy way to tell when the seal and bearing require replacement.

U.S. Pat. No. 5,501,396 teaches a method of sealing water flowing through a central bore of a rotary union. The seal is formed by a pair of hard sealing surfaces pressed together by a spring and surrounded by an O-ring. This compressing causes drag which reduces the efficiency of the pressure wash system. Further, the central bore passage is characterized by many changes in diameter, which creates turbulence in the flow of water and results in a pressure drop in the high-pressure water flowing through between the annular bore inlet and outlet. Further, there is no easy way of determining if the seals are worn, and when it is time to replace the seals. The assembly is not designed to be easily rebuilt on-site, and has to be returned to the manufacturer for any repairs or overhaul.

U.S. Pat. No. 5,456,413 teaches a rotary water blast nozzle that includes an inner body member and a mandrel nozzle that includes a spray head having an internal bushing that rotates on the mandrel. The combination of the operating pressures acting inward on the outside of the bushing between seals, and the gradually diminishing pressures acting outwardly in the clearance from the center toward the ends of the bushing, together with the frusto-conically shaped sections of the bushing, cause a uniform inward deflection that reduces the clearance in proportion to the operating pressure to inhibit leakby. This bearingless system is not designed for high-pressure use, the seals wear gradually, and there is no way to tell when the seals are in need of replacement.

U.S. Pat. No. 4,296,952 teaches a simple rotary joint that utilizes a single anti-friction bearing with a self-aligning or floating seal. Vent holes are provided in the housing sidewall adjacent the seal assembly for venting of any fluid leakage in the case of seal wear, but the bearings are not protected from this leakage and seal leakage requires immediate attention. The seal is formed from materials such as carbon graphite or ceramic. Although such materials provide a good seal, the seal faces have a relatively short useable lifetime. Furthermore, replacement of a damaged or scored rotating seal member requires replacement of the entire rotor assembly.

U.S. Pat. No. 4,817,995 teaches a rotary union that includes a seal assembly having rotating and non-rotating seal members and a compression spring maintaining them in sealing engagement. This spring pressure governs the unit's ability to handle high pressure, since pressure in excess of the spring pressure could overcomes the spring compressive force, causing a space and thus a leak between the sealing surfaces. There are also three vent holes that are located in the housing sidewall by the seal assembly. These vent holes enable fluid to be conducted to the outside of the housing when the seals are worn. However, if the seals are not replaced there is no means to keep the leaking fluid out of the ball bearings. Another problem with this system is that it does not provide a smooth channel for the flow of fluid. The fluid enters through a perpendicular inlet port then encounters obstructions such as spring and recesses. Inefficient water conductance results in a drop in fluid pressure and thus reduced cleaning effectiveness.

High-pressure fluid such as water has been employed for scour cleaning, and at the same time it is relied upon to drive rotating spray heads. In such devices it is equally important that the water and its power be conserved while still effecting the cleaning task.

Thus it would be desirable to have a rotary union that is simple and readily rebuildable so that even relatively unskilled attending personnel may be able to maintain and replace worn parts with the minimum use of tools. This would help in reducing costs and down time for the apparatus on which the rotary union is used.

An objective of the present invention is to provide a new and improved wide throat rotary union designed for high-pressure, high through-put (i.e., high gpm), high rpm liquid blast cleaning operations, which rotary union is constructed and arranged to obviate the foregoing problems.

Another objective of the present invention is to provide a rotary union of the type described which incorporates means to indicate wear of seals.

Still another objective of the present invention is to provide a new and improved rotary union of the type described which is simpler in construction, more efficient in operation, more economical to maintain and operate than prior devices.

SUMMARY OF THE INVENTION

In view of the foregoing disadvantages inherent in known types of rotary unions, it is an object of the present invention to provide a rotary union which can be easily disassembled and rebuilt on site by a non-skilled attendant.

Another objective of this invention is to incorporate an indicator in the rotary union for indication of main seal leakage, which rotary union at the same time incorporates means to protect the bearings from that fluid which by-passes the main seal following main seal failure.

Another objective of this invention is to provide an improved seal assembly for a rotary union which is readily replaceable in the field and which includes seal members characterized by greater wear resistance than that for sealing members used in rotary unions presently available.

Another objective of this invention is to provide is the simplistic flow passage design that provides a smooth, non-turbulent fluid flow, eliminating turbulence and associated loss in fluid pressure between the rotary union inlet and outlet.

These and other objects of the invention have been accomplished by a rotatable bearing assembly comprising a relatively fixed upper housing having an upper end having a fluid passage defined therein, the fluid passage having an upper opening for receiving fluid, an axis of flow, and a lower opening for emitting fluid, the upper housing further having a generally cylindrical lower end having an annular chamber having a diameter greater than the fluid passage, at least part of this annular chamber being internally threaded; a generally cylindrical rotor having an inner wall defining a fluid passage and an outer wall, said rotor fluid passage having an upper opening for receiving fluid, an axis of flow, and a lower opening for emitting fluid, the rotor upper opening in communication with the upper housing fluid passage lower opening; a lower housing externally threaded for engagement with the upper housing lower end internal threading, the upper end of the lower housing defining an opening through which the upper end of the rotor passes, the lower end of the lower housing including an internal cylindrical chamber having an inner wall; a bearing provided with close tolerance between the rotor outer wall and the lower housing cylindrical chamber inner wall for rotatably bearing the rotor about the axis of flow; a first fluid-tight seal provided between the rotor and the upper housing fluid outlet; a vent channel communicating between the rotor and the atmosphere through which any fluid bypassing the first fluid-tight seal is vented to atmosphere; and a second fluid-tight seal provided between the rotor and the lower housing for preventing any of the fluid bypassing the first fluid-tight seal from contacting the bearing.

The rotatable bearing assembly preferably further comprises a gland plate provided between the upper housing and the lower housing, the gland plate having an upper surface, a lower surface, an internal surface, and an external surface, the upper surface of the gland plate having a recess in which the first fluid tight seal is seated, the gland plate having radial channels extending between the gland plate internal surface and the gland plate external surface, the gland plate external surface having an annular recess in fluid communication with the radial channels and also in fluid communication with vents which extend through the upper housing, these radial channels, annular recess and vents comprising a vent channel.

In an even more preferred embodiment of the invention, two or more bearings are provided between said rotor and said lower housing for securely yet rotatably bearing said rotor.

The most preferred embodiments of the present invention include a rotor comprised of or coated with silicon carbide, and main and secondary lip seals formed of glass, ruby, or sapphire filled Teflon®.

The invention further concerns a method of cleaning a surface, comprising supplying water under pressure to a rotary union as described above, which rotary union is in turn coupled to a rotary spray nozzle or sprayer arm(s) which deliver water under high pressure and with high rotation to the surface being cleaned.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other rotary unions for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which.

DETAILED DESCRIPTION OF THE INVENTION

The present invention will now be described in detail by reference to the figures.

Figure 1:
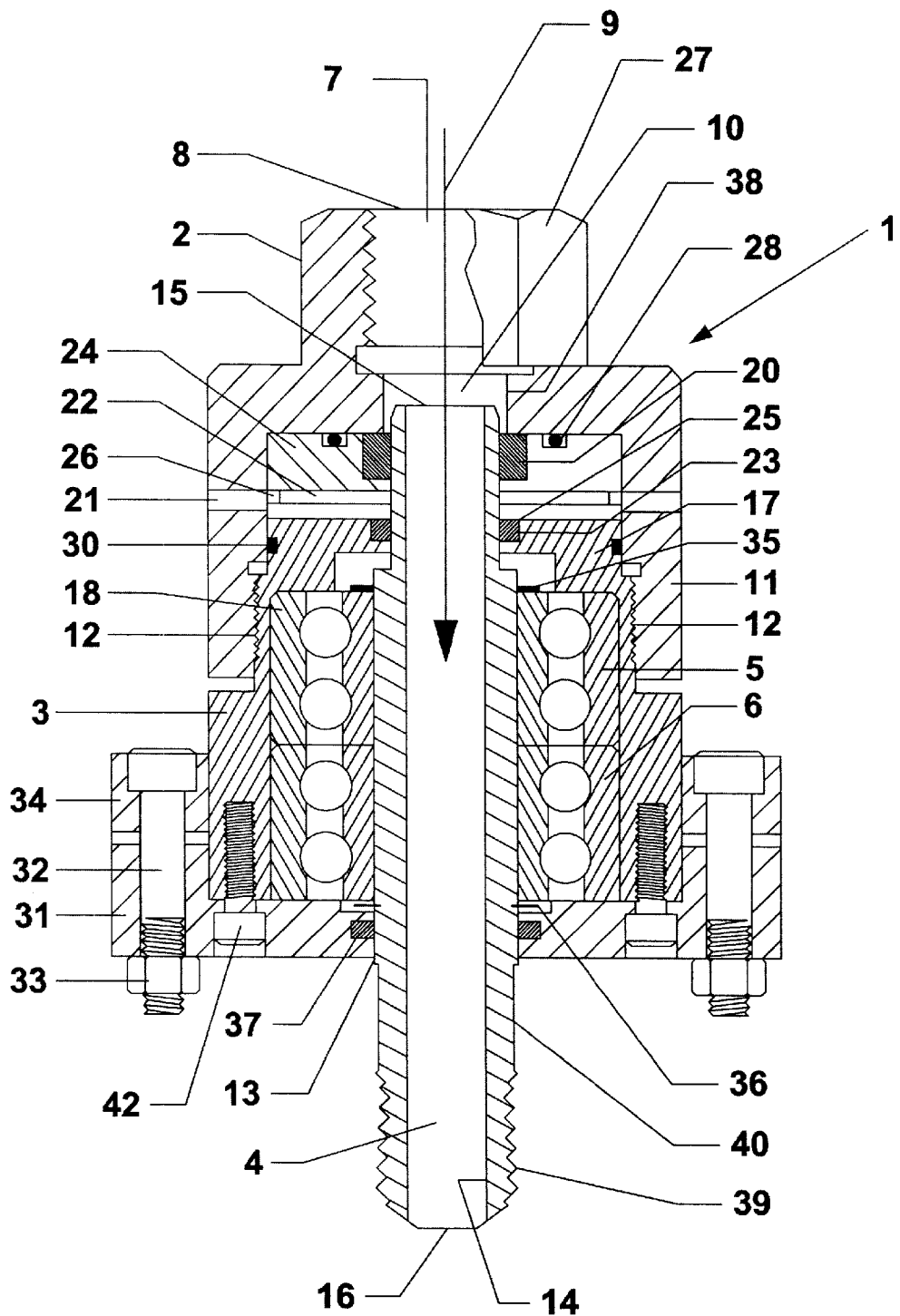
FIG. 1 is a vertical cross-sectional view of a first rotary union according to the invention.

FIG. 1 shows a rotatable bearing assembly 1 essentially comprising a relatively fixed part comprising upper housing 2 and lower housing 3, and a rotor 4 rotatably mounted within the housing parts via radial load thrust bearing(s) 5, 6.

Upper housing 2 has an upper end having a fluid passage 7 defined therein, the fluid passage or inlet has an upper opening 8 for receiving fluid, an axis of flow 9, and a lower opening 10 for emitting fluid. The upper housing further has a generally cylindrical lower end 11 having an annular chamber having a diameter greater than the diameter of the fluid passage, at least part of this annular chamber being internally threaded 12.

Located concentrically within the upper housing 2 is a generally cylindrical rotor 4 having an inner wall 14 defining a fluid passage, and an outer wall 13. The rotor fluid passage has an upper opening 15 for receiving fluid, an axis of flow 9 identical to the axis of flow of the upper housing fluid passage, and a lower opening 16 for emitting fluid. The rotor upper opening 15 is in communication with the upper housing fluid passage lower opening 10.

In this first embodiment the lower housing 3 is externally threaded for engagement with the upper housing lower end internal threading 12. The upper end of the lower housing 17 has a central opening through which the upper end of the rotor 4 passes. The lower end of the lower housing 3 includes an internal cylindrical chamber having an inner wall 18. At least one, preferably more than one, bearing 5, 6 is provided with close tolerance between the rotor 4 outer wall and the lower housing cylindrical chamber inner wall 18. The bearing(s) 5, 6 rotatably bear the rotor so that it is free to rotate and allowed to go with flow 9.

In order to keep the fluid under pressure confined within the fluid passageway, a first fluid-tight seal 20 is provided between the rotor 4 outer wall 13 and the upper housing fluid outlet 10. As this seal 20 wears, fluid would eventually be able to by-pass the seal 20 and penetrate into bearing(s) 5, 6. In order to prevent this penetration, two safeguards are engineered into the rotary union. The first safeguard is a vent channel comprising first and second sections 21, 22 communicating between the rotor and the atmosphere. Any fluid bypassing the first fluid-tight seal 20 is collected in this vent and vented to the atmosphere. The benefit of this vent is that leakage of fluid from the vent is an early and clear indication of seal wear and the need to replace the seal 20.

As the second safeguard, a second fluid-tight seal 23 is provided between the rotor 4 outer wall 13 and the lower housing upper end 17 for preventing any of that fluid which bypasses the first fluid-tight seal 20 from bleeding into and contacting the bearing(s). As the fluid can not pass seal 23, the fluid simply vents through vent channel 21, 22.

The rotatable bearing assembly preferably further comprises a gland plate 24 provided between the upper housing 2 and the lower housing 3. The gland plate 24 has an upper surface, a lower surface, an internal surface, and an external surface. The upper surface of the gland plate has a recess in which the first fluid tight seal 20 is seated. The gland plate 24 also has radial channels 22 extending between the gland plate internal surface and the gland plate external surface. The gland plate circumferential or radially outward surface has an annular recess 26 which forms a channel circumscribing the gland plate, which channel is in fluid communication with the radial channels 22 and also in fluid communication with vents 21 which extend through the upper housing. Thus, at whatever orientation the gland plate is seated, the gland plate channel 22 is in communication with the upper housing vent channel 21. These radial channels 22, annular recess 26 and vents 21 collectively comprising a vent channel.

FIG. 1 depicts an upper housing 2 with a hex shaped projection 27 extending from the upper surface. It can be readily seen that the upper housing 2 can be removed from the lower housing 3 by simply applying a wrench to the hex shaped projection 27 and rotating. This simple act of unscrewing the upper housing 2 from the lower housing 3 exposes gland plate 24 and seals 20 and 23. These exposed seals can be easily replaced, after which the upper and lower housings can be screwed back together.

The upper surface of the gland plate 24 can be provided with an annular notch, and an O-ring 28 can be provided in this annular notch to form a fluid-tight seal between the gland plate and the upper housing. The use of O-ring 28 creates a locking system that prevents the upper housing from unthreading from the lower housing. Since the gland plate 24 and upper housing 2 do not rotate, this O-ring 28 is not liable to wear, and lasts a long time.

The upper housing 2 could be formed of aluminum, titanium, high density plastic, or any other suitable material used in this art having a non-oxidizing or non-corrosive nature.

Figure 3:
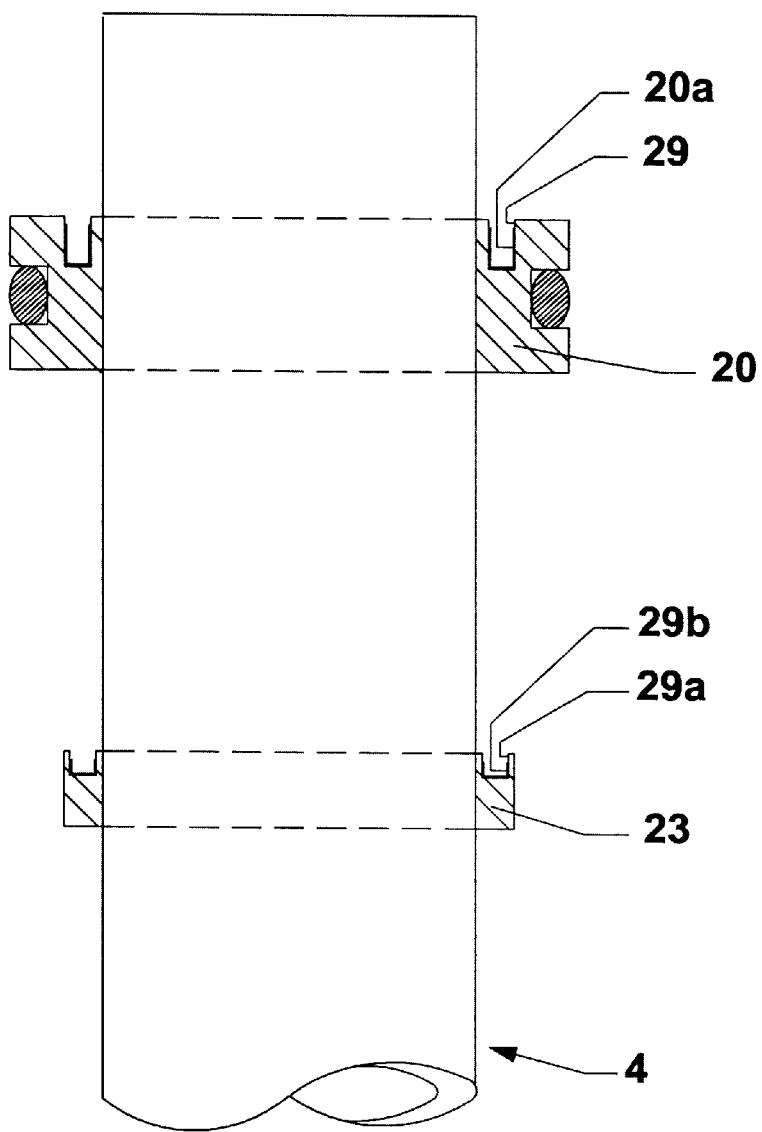
FIG. 3 is an enlarged partial cross-sectional view showing the construction of the main and secondary seals.

FIG. 3 is an enlarged partial cross-sectional view showing the construction of the main and secondary seals. The main seal 20 is preferably a hybrid seal made of Teflon® or other suitable materials which is referred to in the art as a lip seal with a cantilever steel spring 20a placed in a groove 29. The inner lip of the seal 20 lies against rotor 4. Any water pressure entering into the groove of the cantilever steel spring 20a urges the inner lip of the main seal 20 into tighter contact with the rotor 4. Thus, a good seal will be formed for a long time, even as the seal wears, and with the formation of tighter seals as the water pressure increases. This seal 20 is preferably made of Teflon, more preferably glass filled Teflon, and most preferably made of ruby or sapphire filled Teflon for longest life, and preferably has an annular notch circumscribing the outer surface, into which notch a rubber O-ring 19 is placed. Rubber is sufficient for the O-ring 19, since this seal is not subjected to movement.

As seen from FIG. 1, the radially outer surface of the lower housing 3 has a recess to receive an O-ring 30. As seen from FIGS. 1 and 3, a secondary lip seal 23, 123 is mounted inside a recess 25, 125 formed in the upper surface of the lower housing 3, 103 adjacent the rotor 4, 104. This lip seal 23, 123 has a construction and manner of operation which may be identical to that of lip seal 20, 120. That is, it may contain spring 20b and be seated in groove 29a.

To prevent the assembly from coming apart during operation, a bottom bearing plate 31 is secured to the lower housing 3, for example, by four allen headed screws 42. The bottom bearing plate 31 is thus provided with four screw holes through which the screws can pass to screw into the lower housing 3.

A second, more peripheral set of four screw holes is provided in the bottom bearing plate so that the rotary union can be bolted to the housing of, e.g., a driveway cleaning machine by means of bolts 32, nuts 33, and bracket 34.

To hold the radial load thrust bearings 5, 6 in place on the rotor 4 during disassembly of the rotary union 1, these radial load thrust bearings 5, 6 are enclosed between snap rings or retaining rings 35, 36.

The bottom bearing plate 31 is preferably provided with a bore hole dimensioned for the rotor to pass therethrough with close tolerance, with the inner surface of this bore hole facing the rotor outer wall 13 having a groove, and a quad ring seal 37 mounted inside this groove providing a seal preventing water or fluids emitted from the rotary sprayer or spray arms fitted to this rotary union being back-splashed and penetrating the bearings 5, 6. This quad ring seal 37 may be composed of Teflon, or glass, ruby or sapphire filled Teflon. The rotor 4 is composed for example of stainless steel, and is securely yet rotatably mounted by the combination of the bottom bearing plate 31 including quad ring seal 37, radial load thrust bearings 5, 6, seal 23 of bearing housing 3, and seal 20 of gland plate 24. The projecting end of the rotor 4 has a threaded portion 39, for example, with an external pipe thread to which a rotary sprayer or spray arms may be fitted, and is also provided with a wrench flats 40 to tighten the rotor to the rotary sprayer or spray arms. Laterally extending spray arms (not shown) could be attached to the threaded portion 39.

Figure 2:
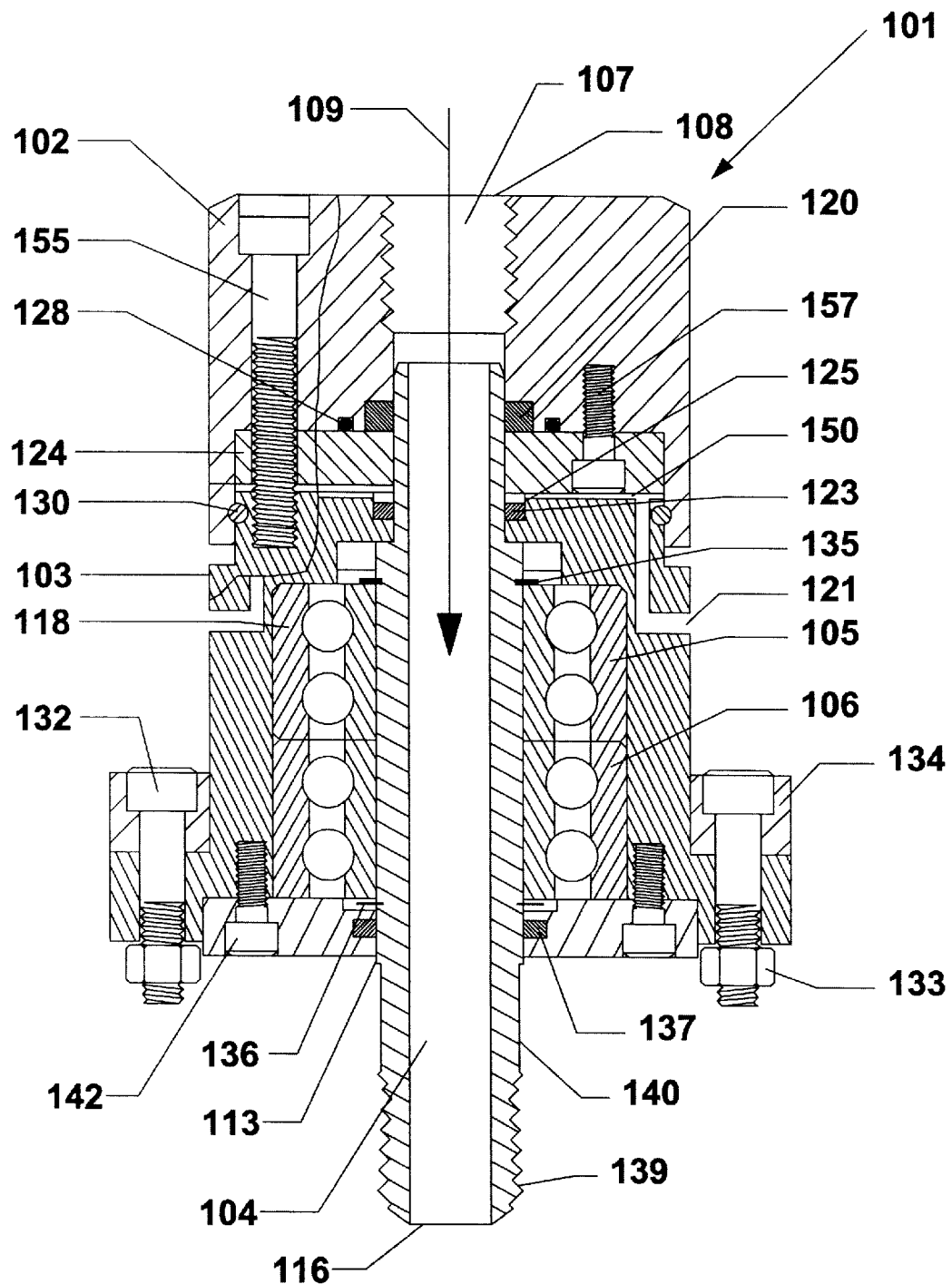
FIG. 2 is a vertical cross-sectional view of a second rotary union also according to the invention.

FIG. 2 shows an alternative embodiment of the invention, the rotary union being similar in overall construction and function but differing in the manner in which upper housing 102 is secured to lower housing 103. That is, instead of internal threads being provided within the upper housing so that upper housing can be screwed onto external treads of the lower housing, bolts 155 are provided for bolting the upper housing 102 directly onto lower housing 103. Further, gland plate 124 is not "free floating" as in FIG. 1, but is bolted in place onto upper housing 102 via gland plate screw 157. Also, in this embodiment, the upper surface of the lower housing or the lower surface of the gland plate 124 have shallow radially extending channels 150 machined in, e.g., 30 thousandths of an inch, extending from the rotor to an annular channel 125 which in turn communicates with vents 121. Water bypassing seal 120 flows along rotor 104 and is prevented from flowing down to bearings 105 by seals 123. Taking the path of least resistance, this water is channeled so as to pass through machined channels 150, through vent channel 121, and out through the lower housing 103 (though it would be possible to have vent channels 121 vent through upper housing 102). Channels 150 need not be large, as their main function is simply to provide indication when the seal 120 is sufficiently worn to so as to no longer provide a complete seal. Given the high operating pressure of the fluid, small channels are sufficient to permit initial fluid leakage to vent to the outside of the housing. Further, the embodiment of FIG. 2 has a bottom bearing plate 131, similar to the bearing plate 31 in FIG. 1, with a quad ring seal 137.

In the rotary union according to FIG. 3, the rotor, or at least the outer surface of the rotor, is treated in a manner to increase hardness and slipperiness. For example, the rotor may be made of a high carbon, high chrome steel (known generically as D2 steel) surface hardened to Rc 60–62, or a metal (preferably ferric, most preferably steel) or metal alloy including ceramic particles at least near the surface, such as silicon carbide or tungsten particle containing articles as disclosed in, e.g., U.S. Pat. Nos. 5,052,464 and 5,560,420, or may be plated with a high hardness (Knoop hardness in excess of 1350) and wear resistant coating such as nickel-boron and cobalt-boron alloy coatings as disclosed in U.S. Pat. No. 5,019,163, the disclosures of which are incorporated herein by reference. The resultant rotor preferably has a Rockwell C surface hardness of 80.

This embodiment allows easy access to the seal system by simply removing the bolts and screws 155, 157 with limited tools and skills, though this disassembly and reassembly operation takes longer than it takes to rebuild the embodiment of the invention shown in FIG. 1.

Turning now to the manner of use of the rotary union 1 as shown in FIGS. 1 and 2, the lower housing 3 of the unit is typically non-rotatably mounted, for example, centrally atop the base or housing of any sprayer or washer. The rotary union receives high-pressure fluid from a relatively stationary, non-rotating source at the inlet, and emits this liquid to a rotating device such as a sprayer or spray bar. High pressure water from a pump or like means (not shown), which may be on the order of 3500–4000 psi at up to 2000 rpm, is connected at the inlet 7 of the upper housing 2. Because of the simplistic design and durable materials making possible a wide throated flow passage of approximately ⅜ inch, the straight-through passageway for the fluid, the smooth walled passageway, and the generally even transition between fixed and rotor portions of the flow passage, output pressure at the rotor exit 16 is the same or close to the same as input pressure at the upper housing inlet 7. Further, the flow rate may be as high as 12 gallons per minute, with rotational speeds in the order of 2,000 rpm. The rotary union as shown in FIG. 1 has been used at pressures as high as 6,000 psi, and the more rapid wear of the bearings which results at such high pressures is made acceptable by the ease and speed of seal replacement.

Inlet 7 receives fluid and communicates this along straight-through flow axis 9 to the hollow rotor shaft 4. As fluid pressure builds up in the flow passage, the main seal 20 forms a tight seal as high-pressure fluid migrates past the ½₀₀ths inch gap between the rotor 4 and the bored recess 38 of the upper housing. Any water that passes through this precision bored recess 38 will build up pressure in groove 29 (FIG. 3) forcing the seal against rotor 4 preventing any leakage of water past main seal 20. The pressure on lip seal 20 forces the pressure on the gland plate and reduces any pressure on the bearing 5. With the pressure being placed on the gland plate, the bearings 5 and 6 do not feel much thrust load. In the event this seal 20 develops a leak the leaked fluid will be trapped in between secondary static O-ring 28, secondary seal 23, and O-ring 30 thereby forcing the leaked fluid to pass through channel 22, annular recess 26 which forms a channel circumscribing the gland plate, and exit vents 21, this being the path of least resistance. Such fluid leakage would provide a visual indication to the equipment attendant of seal wear. Furthermore, the secondary lip seal 23 will prevent the leaked fluid from penetrating into the radial load thrust bearing set 5, 6. Also, any pressure placed upon the bearing 6 would be from back wash entering at the lower opening.

Turning to the task of rebuilding of a leaky rotary union by replacing worn seals, in the first embodiment FIG. 1, replacement of secondary static O-ring 28, main seal 20 and O-ring 30 is accomplished by simply unscrewing the upper housing 2 by applying a tool to a hex projection 27 and rotating. Since the upper housing is simply secured by threads 12 to the lower housing 3 a significant advantage of this embodiment is to allow for easy and rapid access to the seal system. This enables much faster repair to be made on site and with a limited number of tools and only basic skills. The main seal 20 simply lifts out and a new seal can then be dropped into place in the groove provided. Seals 28 and 30 are exposed and easily replaceable as well.

Next, to replace the secondary lip seal 23 one need simply remove the screws 42 from under the bottom bearing plate 31 and the lower housing 3 will slide out. The lip seal 23 simply lifts out and a new seal can then be dropped into place in the groove provided.

To replace the quad ring seal 37 one need simply remove the screws 42 from under the bottom bearing plate 31 to slide plate 31 out. The quad ring seal 37 can simply be lifted out and a new seal dropped into place in the groove provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,
What is claimed is:

1. A rotary union for transmitting fluid under pressure, said rotary union comprising:
   a relatively fixed upper housing having an upper end having a fluid passage defined therein, said fluid passage having an upper opening for receiving fluid, an axis of flow, and a lower opening for emitting fluid;
   a cylindrical silicon carbide rotor, said rotor having an inner wall defining a fluid passage and an outer wall, said rotor fluid passage having an upper opening for receiving fluid, an axis of flow, and a lower opening for emitting fluid, said rotor upper opening in communication with said upper housing fluid passage lower opening;
   a lower housing, the upper end of said lower housing defining an opening through which the upper end of said rotor passes, said lower end of said lower housing including an internal cylindrical chamber having an inner wall;
   metal fasteners for securing said upper housing in relation to said lower housing;
   at least one bearing provided with close tolerance between said rotor outer wall and a lower housing cylindrical chamber inner wall for rotatably bearing said rotor about said axis of flow;
   a first fluid-tight seal provided between said upper housing and said lower housing and contacting said rotor, said first fluid-tight seal being a filled Teflon seal;
   a vent channel communicating through said housing between said rotor and atmosphere, through which vent channel any fluid bypassing said first fluid-tight seal is vented to atmosphere;
   a second fluid-tight seal provided between said rotor and said lower housing for preventing said fluid bypassing said first fluid-tight seal from contacting said bearing; and
   a gland plate provided between said upper housing and said lower housing, said gland plate having an upper surface, a lower surface, an inner surface, and an outer surface, said gland plate fastened to said upper housing via metal fasteners.

2. A rotary union for transmitting fluid under pressure, said rotary union comprising:
   a relatively fixed upper housing having an upper end having a fluid passage defined therein, said fluid passage having an upper opening for receiving fluid, an axis of flow, and a lower opening for emitting fluid; said upper housing further having a generally cylindrical lower end having an annular chamber having a diameter greater than said fluid passage, at least part of said annular chamber being internally threaded;
   a generally cylindrical rotor having an inner wall defining a fluid passage and an outer wall, said rotor fluid passage having an upper opening for receiving fluid, an axis of flow, and a lower opening for emitting fluid, said rotor upper opening in communication with said upper housing fluid passage lower opening;
   a lower housing externally threaded for engagement with said upper housing lower end internal threading, the upper end of said lower housing defining an opening through which the upper end of said rotor passes, said lower end of said lower housing including an internal cylindrical chamber having an inner wall;
   a bearing provided with close tolerance between said rotor outer wall and said lower housing cylindrical chamber inner wall for rotatably bearing said rotor for rotation about said axis of flow;
   a first fluid-tight seal provided between said rotor and said upper housing fluid outlet;
   a vent channel communicating through said housing between said rotor and atmosphere, through which vent channel any fluid bypassing said first fluid-tight seal is vented to atmosphere; and
   a second fluid-tight seal provided between said rotor and said lower housing for preventing said fluid bypassing said first fluid-tight seal from contacting said bearing, and
   further comprising a gland plate provided between said upper housing and said lower housing, said gland plate having an upper surface, a lower surface, an inner surface, and an outer surface, said upper surface of said gland plate having a recess in which said first fluid tight seal is seated, said gland plate having radial channels extending between said gland plate inner surface and gland plate outer surface, said gland plate outer surface having an annular recess, said annular recess in fluid communication with said radial channels and with vents through said upper housing, said radial channels, annular recess and vents comprising a vent channel.

3. A rotary union as in claim 2, wherein said upper surface of said gland plate is provided with an annular notch, and wherein a fluid tight seal is provided in said annular notch forming a seal between said gland plate and said upper housing.

4. A rotary union as in claim 2, wherein said first fluid tight seal is a lip seal, and said second fluid tight seal is a lip seal.

5. A rotary union as in claim 4, wherein each lip seal is comprised of Teflon, glass filled Teflon, ruby filled Teflon, or sapphire filled Teflon.

6. A rotary union according to claim 2, wherein said cylindrical rotor contains silicon carbide.

7. A rotary union according to claim 2, wherein the internal diameter of said rotor is at least about ¼ inch.

8. A rotary union according to claim 2, wherein the internal diameter of said rotor is from about ¼ inch to about ⅜ inch.

9. A rotary union according to claim 2, wherein the internal diameter of said upper housing fluid passage is from about ¼ inch to about ⅜ inch.

10. A rotary union according to claim 2, wherein the internal diameter of said upper housing fluid passage is at least ⅜ inch.

11. A rotary union as in claim 1, further comprising a secondary seal provided between said gland plate upper surface and said upper housing.

12. A rotary union as in claim 1, wherein said upper housing is provided with bore holes, wherein said metal fasteners are screws, and wherein said screws pass through said upper housing and are seated in said lower housing.

13. A rotary union as in claim 1, wherein said first fluid tight seal is a lip seal, and said second fluid tight seal is a lip seal.

14. A rotary union as in claim 1, wherein said filled Teflon is glass filled Teflon, ruby filled Teflon, or sapphire filled Teflon.

15. A rotary union according to claim 1, wherein the internal diameter of said rotor is at least about ¼ inch.

16. A rotary union according to claim 1, wherein the internal diameter of said rotor is from about ¼ inch to about ⅜ inch.

17. A rotary union according to claim 1, wherein the internal diameter of said upper housing fluid passage from about ¼ inch to about ⅜ inch.

18. A method of cleaning a surface, said method comprising:

(a) increasing pressure of a fluid medium to between 3000 and 6000 p.s.i., (b) transmitting said fluid under pressure through a rotary union and out a rotary spray arm to cause said rotary spray arm to rotate, said rotary union comprising:

a relatively fixed upper housing having an upper end having a fluid passage defined therein, said fluid passage having an upper opening for receiving fluid, an axis of flow, and a lower opening for emitting fluid; said upper housing further having a generally cylindrical lower end having an annular chamber having a diameter greater than said fluid passage, at least part of said annular chamber being internally threaded;

a generally cylindrical rotor having an inner wall defining a fluid passage and an outer wall, said rotor fluid passage having an upper opening for receiving fluid, an axis of flow, and a lower opening for emitting fluid, said rotor upper opening in communication with said upper housing fluid passage lower opening;

a lower housing externally threaded for engagement with said upper housing lower end internal threading, the upper end of said lower housing defining an opening through which the upper end of said rotor passes, said lower end of said lower housing including an internal cylindrical chamber having an inner wall;

a bearing provided with close tolerance between said rotor outer wall and said lower housing cylindrical chamber inner wall for rotatably bearing said rotor for rotation about said axis of flow;

a first fluid-tight seal provided between said rotor and said upper housing fluid outlet;

a vent channel communicating through said housing between said rotor and atmosphere, through which vent channel any fluid bypassing said first fluid-tight seal is vented to atmosphere;

a second fluid-tight seal provided between said rotor and said lower housing for preventing said fluid bypassing said first fluid-tight seal from contacting said bearing;

a bottom bearing plate secured to said lower end of said lower housing and including a quad ring seal between said bottom bearing plate and said external wall of said rotor;

a gland plate provided between said upper housing and said lower housing; and a spray arm centrally connected to said outlet of said rotor, said spray arm having spray nozzles for spraying fluid under pressure;

(c) positioning said rotating spray arm adjacent said surface to be cleaned and impacting said surface to be cleaned with said fluid under pressure to thereby clean said surface.

* * * * *